US012753598B2

(12) United States Patent
Shimizu

(10) Patent No.: US 12,753,598 B2
(45) Date of Patent: Oct. 6, 2026

(54) EXCRETION BEHAVIOR RECORDING DEVICE, EXCRETION BEHAVIOR RECORDING METHOD, AND LIFE BEHAVIOR DISPLAY SYSTEM

(71) Applicant: FUJI CORPORATION, Chiryu (JP)

(72) Inventor: Satoshi Shimizu, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 278 days.

(21) Appl. No.: 18/692,484

(22) PCT Filed: Oct. 6, 2021

(86) PCT No.: PCT/JP2021/036973

§ 371 (c)(1),
(2) Date: Mar. 15, 2024

(87) PCT Pub. No.: WO2023/058152

PCT Pub. Date: Apr. 13, 2023

(65) Prior Publication Data

US 2024/0384518 A1 Nov. 21, 2024

(51) Int. Cl.
*E03D 9/00* (2006.01)
*G01M 99/00* (2011.01)

(52) U.S. Cl.
CPC ............. *E03D 9/00* (2013.01); *G01M 99/001* (2013.01)

(58) Field of Classification Search
CPC ............................... E03D 9/00; G01M 99/001
See application file for complete search history.

(56) References Cited

U.S. PATENT DOCUMENTS

2012/0208155 A1* 8/2012 Deleo ................ G09B 19/0076 434/236
2016/0278706 A1 9/2016 Okamoto et al.
2022/0044801 A1* 2/2022 Murthy ................ G06K 7/1417
2023/0020686 A1* 1/2023 Kamai ................. A61B 5/6891

FOREIGN PATENT DOCUMENTS

CN 112160393 A * 1/2021 ............. E03D 11/04
ES 2587631 T3 * 10/2016 ............... G08B 5/36
JP 10-299066 A 11/1998
JP 2009243098 A * 10/2009
JP 2009258078 A * 11/2009
JP 2010220761 A * 10/2010
JP 2013090748 A * 5/2013
(Continued)

OTHER PUBLICATIONS

International Search Report mailed on Dec. 28, 2021 in PCT/JP2021/036973 filed on Oct. 6, 2021, 2 pages.

*Primary Examiner* — Chico A Foxx
(74) *Attorney, Agent, or Firm* — Oblon, McClelland, Maier & Neustadt, L.L.P.

(57) ABSTRACT

An excretion behavior recording device includes a detection section configured to detect vibration of a toilet bowl, an extraction section configured to extract a feature value included in a vibration waveform and indicating excretion behavior of each of urination and defecation of a user, a determination section configured to determine whether an occurrence cause of the vibration is the urination or the defecation based on the extracted feature value, and a recording section configured to record the determined urination and defecation.

13 Claims, 3 Drawing Sheets

(56) References Cited

FOREIGN PATENT DOCUMENTS

| | | | | | |
|---|---|---|---|---|---|
| JP | 2014-186402 | A | | 10/2014 | |
| JP | 2017189444 | A | * | 10/2017 | |
| JP | WO 2018/158978 | A | | 9/2018 | |
| JP | 2020-20197 | A | | 2/2020 | |
| JP | 2022184781 | A | * | 12/2022 | |
| JP | 2025088703 | A | * | 6/2025 | |
| WO | WO-2021151446 | A1 | * | 8/2021 | ............. E03D 11/00 |
| WO | WO-2021192475 | A1 | * | 9/2021 | ............. G16H 40/67 |

* cited by examiner

EXCRETION BEHAVIOR RECORDING DEVICE, EXCRETION BEHAVIOR RECORDING METHOD, AND LIFE BEHAVIOR DISPLAY SYSTEM

TECHNICAL FIELD

The present description relates to an excretion behavior recording device and an excretion behavior recording method for recording excretion behavior of a user of a toilet bowl, and a life behavior display system including the excretion behavior recording device.

BACKGROUND ART

Along with the progress of the aging society, development of a system for supporting nursing care of an elderly person at home or a person (user) having a chronic disease, in particular, a nursing care support system for remotely supporting nursing care by applying IT technique, has been advanced. The nursing care support system detects life behavior or a health condition of the user and notifies a distant care manager or a service provider of a nursing care service. Specific examples of the life behavior to be detected include excretion behavior, meal behavior, and sleep behavior. Conventionally, the life behavior of the user has been estimated based on the used amounts of electricity, gas, and water.

Meanwhile, the care manager prepares or corrects a care plan based on an actual condition with reference to the notification from the nursing care support system. The service provider changes a content of the nursing care service with reference to the notification. For example, when the life behavior or the health condition of the user gradually decreases, the care plan is corrected to a care plan that is more hospitable than before, and the nursing care contents are enhanced. Technique examples of this type of the nursing care support system are disclosed in Patent Literatures 1 and 2, and examples of detection technique related to excretion behavior are disclosed in Patent Literatures 3 and 4.

An excretion detection system of Patent Literature 1 includes a gas sensor that detects gas generated from the excretion, acquisition means for extracting a feature value of a detection signal of the gas sensor to acquire a feature value vector, excretion determination means for checking the feature value vector against a feature value space to determine an excretion state, and notification means of the excretion state. With this excretion detection system, it is possible to accurately detect the excretion by recognizing an excretion pattern for each individual by using the gas sensor.

A life watching support device of Patent Literature 2 is connected to a device that acquires behavior information of a user and a device that acquires biometric information of the user, and includes a behavior estimation section that estimates a life behavior state based on the behavior information of the user, a health condition determination section that determines a health condition of the user based on the life behavior information and the biometric information, and an output control section that displays a watching screen including the health condition on a display device on a watcher side. With this life watching support device, the health condition of the user can be obtained and provided to the watcher side.

A flush toilet bowl device of Patent Literature 3 includes a first vibration sensor that detects a first vibration component based on a water flow in a water discharge trap of a toilet bowl main body, a second vibration sensor that is attached to a position at which the water flow is difficult to detect, to detect a second vibration component, and a discharge state determination section that subtracts the second vibration component from the first vibration component to obtain a net vibration component based on the water flow, and determines a failure of a water discharge state of the toilet bowl main body. With this flush toilet bowl device, it is possible to suppress the influence of the vibration based on other than the water flow, and to improve the accuracy of determining the failure in the water discharge state of the toilet bowl main body.

A urinal cleaning system of Patent Literature 4 includes vibration detection means attached to a toilet bowl, determination means for determining the presence or absence of urination based on the output of the vibration detection means, and means for causing cleaning liquid to flow out into the toilet bowl based on the determination result of the determination means. With this urinal cleaning system, since it is possible to accurately estimate the state of the toilet bowl by detecting the vibration, it is possible to flow appropriate cleaning liquid in accordance with the use state.

PATENT LITERATURE

Patent Literature 1: WO-A-2018/158978
Patent Literature 2: JP-A-2014-186402
Patent Literature 3: JP-A-2020-20197
Patent Literature 4: JP-A-H10-299066

BRIEF SUMMARY

Technical Problem

In the technique of Patent Literature 1, the gas sensor is used to detect the excretion behavior of the user and manage the health condition, but is targeted for the user (bedridden user) who lies on a bedding or a bed. Accordingly, this technique cannot be applied to the user of the toilet bowl. In the current technique targeted for the user of the toilet bowl, it is becoming mainstream to use a camera type sensor attached to a toilet seat. The camera type sensor can estimate the health condition by analyzing properties of urine and excrement by imaging urine and excrement.

However, when the purpose is to obtain a life cycle having a lower management level than the management of the health condition, the properties of the urine and the excrement are not essential, and it is considered that distinction between the urination and the defecation and recording of the number of times of each of the urination and the defecation are sufficient. In this case, if the camera type sensor is applied, it is necessary to replace the toilet seat with one having a sensor, which causes a problem in cost and labor in a case of introduction. In other words, in order to obtain the life cycle of the user, the system to which the camera type sensor is applied is considered to be overinvestment.

The device that acquires the behavior information disclosed in Patent Literature 2 is capable of estimating the life behavior of the user. However, there is no description of specific means for detecting the excretion behavior of the user. Further, in Patent Literatures 3 and 4, the vibration of the toilet bowl is detected, but there is no description about distinction between the urination and the defecation of the user.

Therefore, an object of the present description is to provide an excretion behavior recording device and an excretion behavior recording method that can distinguish and record each of urination and defecation of a user and can be introduced at low cost, and to provide a life behavior display system including the excretion behavior recording device.

Solution to Problem

The present description discloses an excretion behavior recording device including a detection section configured to detect vibration of a toilet bowl, an extraction section configured to extract a feature value included in a vibration waveform and indicating excretion behavior of each of urination and defecation of a user, a determination section configured to determine whether an occurrence cause of the vibration is the urination or the defecation based on the extracted feature value, and a recording section configured to record the determined urination and defecation.

In addition, the present description discloses an excretion behavior recording method including a detection step of detecting vibration of a toilet bowl, an extraction step of extracting a feature value included in a vibration waveform and indicating excretion behavior of each of urination and defecation of a user, a determination step of determining whether an occurrence cause of the vibration is the urination or the defecation based on the extracted feature value, and a recording step of recording the determined urination and defecation.

Furthermore, the present description discloses a life behavior display system including the excretion behavior recording device described above, a life behavior recording device configured to detect and record life behavior other than the excretion behavior of the user in a residence, and a display device configured to display multiple items of the life behavior including the excretion behavior of the user in a time-series graphic form.

Advantageous Effects

In the excretion behavior recording device, the excretion behavior recording method, and the life behavior display system disclosed above, the vibration waveform is acquired by detecting the vibration of the toilet bowl, the feature value of the vibration waveform is extracted, the urination and the defecation are determined based on the feature value, and each of the urination and the defecation of the user is recorded. Therefore, it is possible to distinguish and record each of the urination and the defecation of the user. In addition, since the detection section can be easily attached to the outer surface of the toilet bowl and the replacement of the toilet seat or the like is not necessary, and the detection section is less expensive than the camera type sensor, the introduction cost is reduced.

DESCRIPTION OF EMBODIMENTS

1. Excretion Behavior Recording Device 1 of Embodiment

Figure 1:
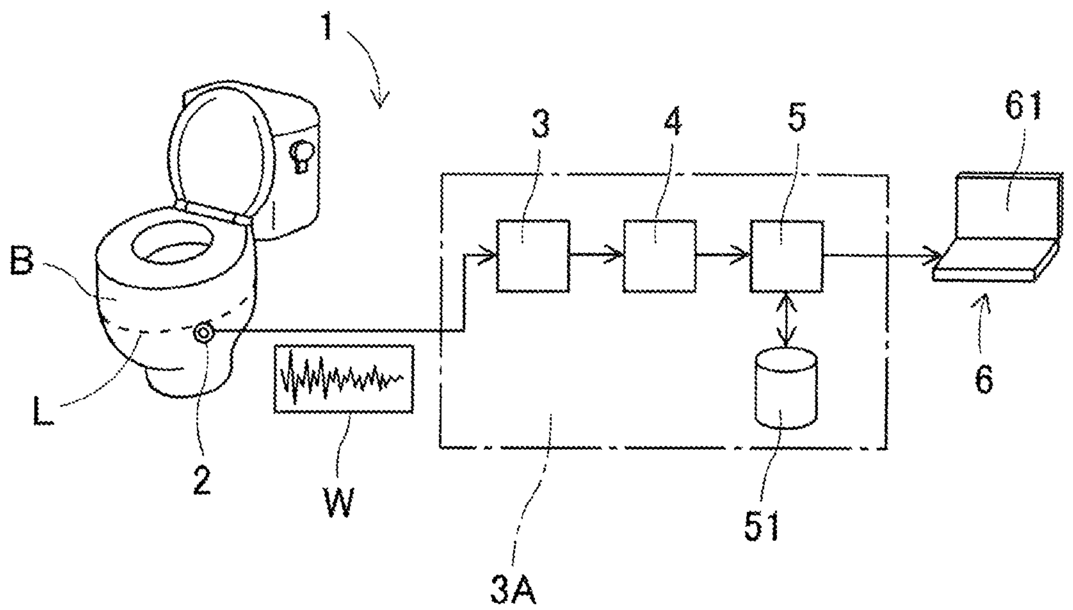
FIG. 1 is a diagram schematically illustrating a configuration of an excretion behavior recording device of an embodiment.

A configuration of excretion behavior recording device 1 of the embodiment will be described with reference to FIG. 1. Excretion behavior recording device 1 is a device that focuses on excretion behavior for the purpose of obtaining a life cycle of a user. Excretion behavior recording device 1 sets one user as a recording target and sets toilet bowl B exclusively used by the user as a detection target. Therefore, the user who lives alone in a residence is a main recording target. Excretion behavior recording device 1 distinguishes and records urination and defecation of the user. Excretion behavior recording device 1 includes detection section 2, extraction section 3, determination section 4, recording section 5, and the like, and further includes display section 61.

2. Detection Section 2

Detection section 2 detects vibration of toilet bowl B and outputs detected vibration waveform W. Detection section 2 is attached to an outer surface of toilet bowl B. Specifically, it is preferable that detection section 2 is attached to a position on the outer surface of toilet bowl B within a range of a height of cleaning water stored in toilet bowl B, and in particular, attached to a slightly below water surface level L of the cleaning water. Multiple detection sections 2 may be provided. The adhesion between toilet bowl B and detection section 2 can be secured by the attachment method using an adhesive or the like. Accordingly, the attenuation of the vibration on the attachment surface is suppressed. This attachment method does not require replacement of the toilet seat or the like, is easy, and takes no time and effort.

With the above-described attachment method, detection section 2 can detect the vibration of toilet bowl B with high sensitivity. Detection section 2 includes one or more of a signal line, a wired communication section, and a wireless communication section as a unit configured to output vibration waveform W. A replaceable dry battery, a power supply section connected to an AC 100V power supply in the residence, or the like can be used as the power supply of detection section 2.

A vibration sensor that detects the vibration in a frequency band lower than an audible range can be used as detection section 2. The configuration is not limited to this, and detection section 2 may be a sound sensor that detects vibration in the audible range, an ultrasonic sensor that detects vibration in a frequency band higher than the audible range, or the like. That is, in the present description, the frequency of the vibration detected by detection section 2 is not limited. Detection section 2 is less expensive than a camera type sensor for analyzing properties of urine and excrement.

Vibration waveform W is generated by the excretion behavior of the user. In other words, the excreted urine or excrement collides with toilet bowl B to generate the vibration. In addition, the urine or the excrement falls into the cleaning water to vibrate the cleaning water, and the vibration propagates to toilet bowl B. Vibration waveform W is also generated during an opening/closing operation of a toilet bowl cover or the toilet seat, when the user is seated, and when the cleaning water is discharged. Further, noise caused by various vibration sources or background noise may be detected by detection section 2. The background noise is generally vibration in which the vibration source is not specified, the amplitude is small, and an occurrence frequency or an occurrence timing is irregular. Vibration waveform W caused by an occurrence cause other than the urine and the excrement is not an original detection target and can be referred to as noise.

3. Extraction Section 3

Extraction section 3, determination section 4, and recording section 5 are integrally configured using field-programmable gate-array (FPGA) device 3A. FPGA device 3A is provided away from detection section 2 or provided integrally with detection section 2. FPGA device 3A acquires vibration waveform W from detection section 2 using one or more of the signal line, the wired communication section, and the wireless communication section.

FPGA device 3A refers to an "integrated circuit that can be programmed on site", and can perform individual waveform processing and determination processing on each toilet bowl B. For example, since an occurrence state of the vibration and the propagation characteristics are different depending on a structure of toilet bowl B, the method of the waveform processing performed by extraction section 3 on vibration waveform W can be changed, or the determination value used by determination section 4 can be individually set.

Extraction section 3 extracts a feature value that is included in vibration waveform W and indicates the excretion behavior of each of the urination and the defecation of the user. In the present embodiment, the feature value includes duration time TC of vibration waveform W and maximum amplitude value AM of vibration waveform W. Duration time TC is a time period in which the amplitude of vibration waveform W exceeds a noise level of the background noise. That is, extraction section 3 holds the noise level of the background noise that may be different for each toilet bowl B, and obtains duration time TC and maximum amplitude value AM by using, as a target, vibration waveform W exceeding the noise level.

Extraction section 3 preferably includes a bandpass filter, and more preferably includes multiple types of bandpass filters having different pass frequency bands. A first object including the bandpass filter is to remove the noise, and a second object is to distinguish between the urination and the defecation. A frequency band in which the noise occurs, a characteristic frequency band of the vibration in a case of the urination, and a characteristic frequency band of the vibration in a case of the defecation can be individually actually measured by using, as a target, toilet bowl B in each residence. Accordingly, it is possible to appropriately set the pass frequency band of the bandpass filter by adjusting FPGA device 3A by using, as a target, each toilet bowl B based on the actual measurement result.

That is, it is possible to provide a bandpass filter having a first pass frequency band that passes a vibration component in a case of the urination while removing the noise from one vibration waveform W, and a bandpass filter having a second pass frequency band that passes a vibration component in a case of the defecation while removing the noise from one vibration waveform W. Extraction section 3 can extract the feature value from each of the vibration waveform for urination determination and the vibration waveform for defecation determination, which are output from the two bandpass filters. Accordingly, even when the urination and the defecation overlap each other in terms of time, extraction section 3 can separately extract the feature values by using, as targets, two vibration waveforms. However, the multiple types of bandpass filters are not essential, and extraction section 3 may extract the feature value by using, as a target, original vibration waveform W or one waveform obtained by removing the noise from vibration waveform W.

4. Determination Section 4

Figure 2:
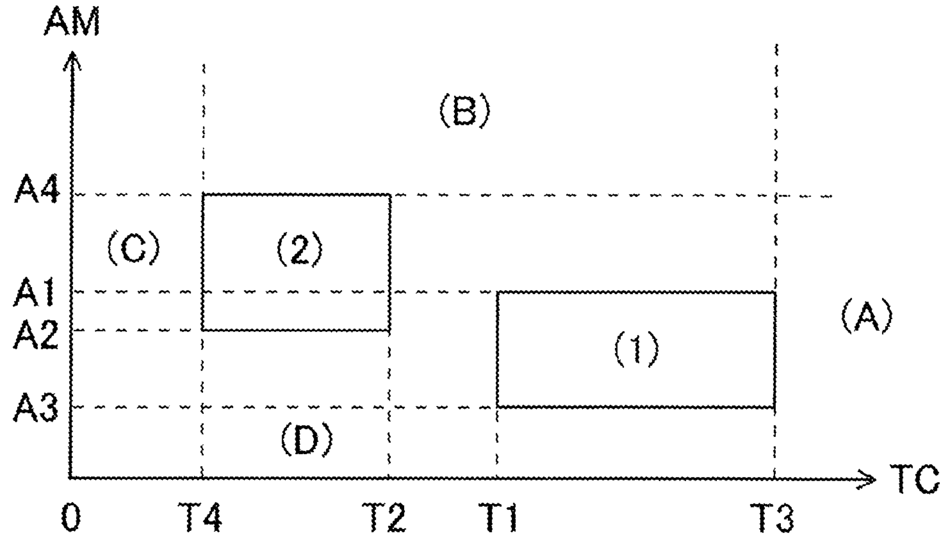
FIG. 2 is a diagram for conceptually illustrating a determination method of urination, defecation, and noise by a determination section.

Determination section 4 determines whether the occurrence cause of the vibration is the urination or the defecation based on the extracted feature values, that is, duration time TC and maximum amplitude value AM. An example of the determination method of determination section 4 is illustrated in FIG. 2. In FIG. 2, a horizontal axis represents duration time TC of vibration waveform W, and a vertical axis represents maximum amplitude value AM of vibration waveform W. Rectangular region (1) in the figure indicates the urination, rectangular region (2) indicates the defecation, and regions (A) to (D) indicate the noise.

When the influence of the background noise or other noise is small or when sufficient noise removal can be performed, determination section 4 performs the determination as follows. That is, when duration time TC is longer than first threshold time T1 and maximum amplitude value AM is smaller than first threshold amplitude value A1, determination section 4 determines that the occurrence cause of the vibration is the urination. When duration time TC is shorter than second threshold time T2 and maximum amplitude value AM is larger than second threshold amplitude value A2, determination section 4 determines that the occurrence cause of the vibration is the defecation. Furthermore, when it is not possible to determine that the occurrence cause of the vibration is at least one of the urination and the defecation, determination section 4 determines that the occurrence cause of the vibration is the noise other than the urination and the defecation.

Actually, the influence of the background noise or other noise should be taken into consideration in many cases. In this case, in a case of region (1) in which duration time TC is longer than first threshold time T1 and shorter than third threshold time T3, and maximum amplitude value AM is smaller than first threshold amplitude value A1 and larger than third threshold amplitude value A3, determination section 4 determines that the occurrence cause of the vibration is the urination. In addition, in a case of region (2) in which duration time TC is shorter than second threshold time T2 and longer than fourth threshold time T4 and maximum amplitude value AM is larger than second threshold amplitude value A2 and smaller than fourth threshold amplitude value A4, determination section 4 determines that the occurrence cause of the vibration is the defecation. Furthermore, determination section 4 determines that the occurrence cause of the vibration is the noise in a region other than the two regions described above.

In FIG. 2, as the noise in region (A) in which duration time TC is longer than third threshold time T3, for example, there is the vibration during an operation of a ventilation mechanism for deodorization. In addition, as the noise in region (B) in which maximum amplitude value AM is larger than fourth threshold amplitude value A4, for example, there is the vibration when cleaning water is discharged. As the noise in region (C) in which duration time TC is shorter than fourth threshold time T4, for example, there is the vibration during the opening/closing operation of the toilet bowl cover or the toilet seat, and the vibration when the user sits on the seat. As the noise in region (D) in which maximum amplitude value AM is smaller than third threshold amplitude value A3, for example, there is the background noise.

As described above, the four threshold times and the four threshold amplitude values illustrated in the drawing can be set to different values for each toilet bowl B. This setting can be performed by adjusting FPGA device 3A. That is, it is possible to optimize operation conditions of excretion behavior recording device 1 by actually measuring vibration waveform W in a case of the urination and in a case of the defecation, actually measuring the occurrence state of the noise, and adjusting FPGA device 3A based on the actual measurement result, after an attachment worker takes a business trip to the residence of the user and attaches detection section 2. Although a magnitude relationship between the respective threshold times and a magnitude relationship between the respective threshold amplitude values are not limited, it is necessary to adopt the setting such that region (1) and region (2) not to overlap each other.

5. Recording Section 5

Recording section 5 distinguishes and records the urination and the defecation determined by determination section 4. Specifically, recording section 5 records the urination and the defecation in association with the occurrence dates and times of the urination and the defecation, respectively. Recording section 5 counts and records the number of times of the urination and the defecation per day. Furthermore, recording section 5 may also record additional information such as a time required for the user to take the excretion behavior.

When an interval between 2 times of the urination is equal to or less than a predetermined time, recording section 5 records 2 times of the urination as 1 time of the urination. For example, when detection section 2 detects two vibration waveforms W at intervals of three minutes and determination section 4 determines 2 times of the urination, it is more natural to consider that one excretion behavior of the user is divided into two. Here, the predetermined time such as 10 minutes longer than 3 minutes in the above example is set. Then, for the determination of 2 times of the urination by determination section 4 within the predetermined time, recording section 5 considers and records 2 times of the urination as 1 time of the urination.

In addition, as in a case of the urination, when an interval between 2 times of the defecation is equal to or less than the predetermined time, recording section 5 collectively records 2 times of the defecation as 1 time of the defecation. When determination section 4 determines 1 time of the urination and 1 time of the defecation within the predetermined time, recording section 5 separately records 1 time of the urination and 1 time of the defecation.

A recording destination of recording section 5 is internal memory 51 of FPGA device 3A. The configuration is not limited to this, and recording section 5 may perform the recording in an external memory via wired communication or wireless communication. As the external memory, for example, a memory of personal computer 6 having display section 61 can be illustrated. Detection section 2, extraction section 3, determination section 4, and recording section 5 sequentially operate to execute an excretion behavior recording method of the embodiment.

6. Display Section 61

Display section 61 displays a content recorded by recording section 5. In the present embodiment, a display program in personal computer 6 operates to edit the recorded content of internal memory 51 or the external memory and display the edited content on display section 61. Display section 61 may be located at a position away from the residence of the user and may be capable of acquiring the recorded content of recording section 5 using a public communication line such as the Internet.

Display section 61 displays the excretion behavior in a time-series graphic form. For example, in a display example of display section 61 illustrated in FIG. 3, the "excretion behavior for one week" of the user is displayed in a time-series graph. At the upper left of the display example, a display target period "2020 Sep. 7 to 09/13" and a name of the user "Mr./Ms. OO" are displayed. In addition, in the displayed graph, a polygonal line graph of a white circle and a broken line represents a transition of the number of times of urination per day, and a polygonal line graph of a black circle and a solid line represents a transition of the number of times of defecation per day. Above the graph, the number of times of defecation through one week is displayed as 12 times, and the number of times of urination through one week is displayed as 33 times. Note that the display target period is not limited to one week, and may be two weeks or one month, and can be set to be variable.

A care manager in charge of the user or a service provider of a nursing care service can decide whether the excretion behavior of the user is good by visually checking the display content of display section 61. In this case, since the number of times of urination and the number of times of defecation are separately displayed in a graphic form, the visual check and the decision are easy. For example, when the number of times of urination or the number of times of defecation significantly increases or decreases, there is concern about poor physical condition of the user. Therefore, the care manager or the service provider can take a countermeasure, such as telephone inquiries, temporary visiting nursing care, and the like.

In excretion behavior recording device 1 of the embodiment, detection section 2 acquires vibration waveform W by detecting the vibration of toilet bowl B, extraction section 3 extracts the feature value of vibration waveform W, determination section 4 determines the urination and the defecation based on the feature value, and recording section 5 records each of the urination and the defecation of the user. Therefore, it is possible to distinguish and record each of the urination and the defecation of the user. In addition, since detection section 2 can be easily attached to the outer surface of toilet bowl B and the replacement of the toilet seat or the like is not necessary, and detection section 2 is less expensive than the camera type sensor, the introduction cost is reduced.

7. Life Behavior Display System 1A of Embodiment

Life behavior display system 1A of the embodiment will be described. In the nursing care support system of the conventional art, the life behavior of the user is indirectly estimated based on the used amounts of electricity, gas, and water. However, since this estimation method is indirect, it is difficult to accurately capture the life behavior of the user. For example, it is difficult to distinguish between multiple types of the life behavior estimated from the use of water, such as taking a bath, cooking, washing a face, and using a bathroom. In addition, in the conventional art disclosed in Patent Literature 2 or the like, since the life behavior of the user is displayed in a table form, it is not easy to visually check whether the user regularly and favorably passes every day.

Figure 4:
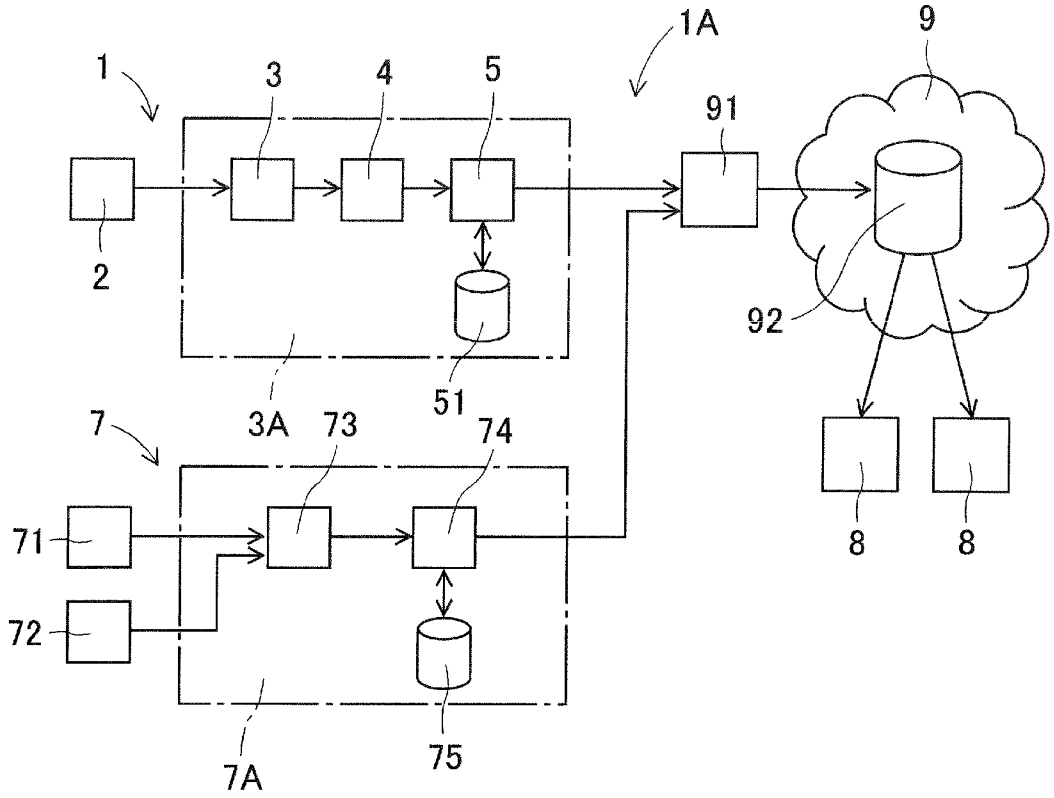
FIG. 4 is a diagram schematically illustrating a configuration of a life behavior display system of the embodiment.

Life behavior display system 1A of the embodiment is a solution to the above-described problem. Life behavior display system 1A is a system that focuses on multiple items of the life behavior for the purpose of obtaining the life cycle of the user. Life behavior display system 1A detects multiple items of the life behavior by using, as a target, one user, and displays the detected life behavior in a time-series graphic form. As illustrated in FIG. 4, life behavior display system 1A includes excretion behavior recording device 1, life behavior recording device 7, display device 8, and the like, and uses a service of cloud server 9.

Excretion behavior recording device 1 is already described above. However, display section 61 is omitted. For the urination and the defecation determined by determination section 4, recording section 5 takes a pre-excretion preparation time into consideration for a generation time of vibration waveform W and takes a post-excretion treatment time into consideration for a disappearance time of vibration waveform W. The pre-excretion preparation time is a time from when the user enters the bathroom to when the user actually starts the urination or the defecation. The post-excretion treatment time is a time from when the user actually ends the urination or the defecation to when the user leaves the bathroom. Accordingly, recording section 5 sets a time earlier than the generation time of vibration waveform W by the pre-excretion preparation time as a start time of the excretion behavior, and sets a time later than the disappearance time of vibration waveform W by the post-excretion treatment time as an end time of the excretion behavior.

It is preferable that the pre-excretion preparation time and the post-excretion treatment time are individually set for each user because the pre-excretion preparation time and the post-excretion treatment time greatly differ depending on the user. The pre-excretion preparation time and the post-excretion treatment time may naturally vary depending on each excretion behavior of the user, and include errors. Even in this case, the time required for the excretion behavior can be brought close to the actual state by taking the pre-excretion preparation time and the post-excretion treatment time into consideration.

Recording section 5 records excretion data in which of urination and defecation the excretion was, the occurrence date, the start time, and the end time are associated with each other in internal memory 51. Further, recording section 5 transmits the same excretion data to cloud access section 91. Note that recording section 5 may omit the recording of the excretion data in internal memory 51 and perform only transmission to cloud access section 91. Cloud access section 91 corresponds to, for example, communication software that always operates on the personal computer in the residence of the user. Cloud access section 91 transmits the received excretion data to cloud server 9.

Cloud server 9 is a part of a known computer service system that allows accesses by multiple users. Cloud server 9 requests input of an ID code and a password in a case of user access, and secures confidentiality. Cloud server 9 stores the received excretion data in cloud memory 92.

Life behavior recording device 7 detects and records the life behavior other than the excretion behavior of the user in the residence. Examples of the life behavior other than the excretion behavior of the user include the meal behavior, the sleep behavior, face washing and hand washing behavior, clothing change behavior, and bathing behavior. In the present embodiment, the meal behavior and the sleep behavior are the detection and recording targets. Life behavior recording device 7 includes first detection section 71, second detection section 72, analysis section 73, recording section 74, and the like.

Two detection sections (71, 72) detect movement of the user in the residence. As detection sections (71, 72), a video camera, a radar sensor, an infrared camera, or the like can be used, and multiple cameras or multiple types of cameras can be used in combination. First detection section 71 is disposed in a dining room in which the user ingests a meal. Second detection section 72 is disposed in a bedroom where the user is sleeping. Two detection sections (71, 72) transmit movement data acquired by detecting the movement of the user to analysis section 73.

Analysis section 73 and recording section 74 can be configured using computer device 7A. Analysis section 73 analyzes the movement in the received movement data to obtain the life behavior of the user. Analysis section 73 analyzes, for example, the positions, postures, and movement directions of the trunk, the head, and the four limbs of the user to specify the life behavior. Specifically, in the movement data of first detection section 71, when the user sits on the chair and moves his/her hand between the table and the head, analysis section 73 determines that the user takes the meal behavior. In a case where the user is lying on the bedding in the movement data of second detection section 72, analysis section 73 determines that the user takes the sleep behavior. Analysis section 73 further differentiates between light sleep and deep sleep based on a movement state such as movement of the four limbs or turning over. Analysis section 73 transmits the start time and the end time of each of the meal behavior, the light sleep behavior, and the deep sleep behavior to recording section 74.

Recording section 74 receives an input of a meal menu by the user in relation to the meal behavior. Recording section 74 records meal data in which the occurrence date, the start time, the end time, and the meal menu of the meal behavior are associated with each other in memory 75. Furthermore, recording section 74 transmits the same meal data to cloud access section 91. In addition, recording section 74 records sleep data in which the occurrence date, the start time, and the end time of the light sleep behavior and the deep sleep behavior are associated with each other in memory 75. Furthermore, recording section 74 transmits the same sleep data to cloud access section 91. Recording section 74 may only transmit the meal data and the sleep data to cloud access section 91 without recording the meal data and the sleep data in memory 75.

Cloud access section 91 transmits the received meal data and sleep data to cloud server 9. Cloud server 9 stores the meal data and the sleep data in cloud memory 92. Accordingly, cloud memory 92 accumulates the excretion data, the meal data, and the sleep data.

Display device 8 displays multiple items of the life behavior including the excretion behavior of the user in a time-series graphic form. Display device 8 can access cloud server 9 and can be provided away from the residence of the user. Multiple display devices 8 can be provided. Display device 8 corresponds to, for example, a smartphone or a tablet terminal possessed by the care manager, or a personal computer provided in a nursing care service company.

Figure 5:
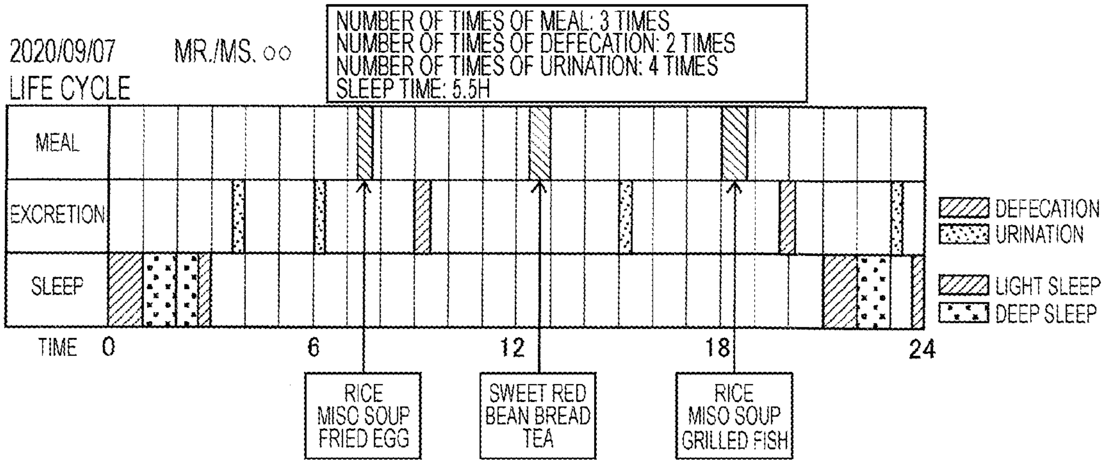
FIG. 5 is a diagram illustrating an example in which a display device displays multiple items of the life behavior of a user in a graphic form of a daily life cycle.

In the present embodiment, display device 8 displays the meal behavior, the excretion behavior, and the sleep behavior of the user in a daily life cycle in a graphic form. That is, display device 8 performs graphic representation into a daily "life cycle" as illustrated in FIG. 5 as an example of displaying in a time-series graphic form. At the upper left of the display example of FIG. 5, the date "2020 Sep. 7" of the display target date and the name "Mr./Ms. OO" of the user are displayed.

In the display example of FIG. 5, three band graphs are displayed corresponding to three types of the life behavior of the meal, the excretion, and the sleep. In each band graph, the left end represents 0 o'clock, the right end represents 24 o'clock, and the band graph is divided by thin lines at a pitch of one hour. In the band graph of the meal in the upper stage, the meal behavior of the breakfast from the start time 7:20 to the end time 7:50 is displayed by hatching. Further, the meal menu of the breakfast "rice/miso soup/fried egg" is displayed at a position corresponding to the breakfast outside the lower field. In addition, the meal behavior of the lunch from 12:20 to 13:00, and the meal menu "sweet red bean bread/tea" is displayed. Further, the meal behavior of the dinner from 18:00 to 18:50, and the meal menu "rice/miso soup/grilled fish" is displayed.

Further, in the band graph of the excretion in the middle stage, the defecation and the urination are displayed by different hatching. For the excretion behavior, the start time and the end time are displayed as in the meal behavior. Further, in the band graph of the sleep in the lower stage, the light sleep and the deep sleep are displayed by hatching different from each other. For the sleep behavior, the start time and the end time are displayed as in the meal behavior. In addition, the number of times of meal per day is displayed as 3 times outside the upper field of the band graph. After the display, the number of times of defecation is displayed as 2 times, the number of times of urination is displayed as 4 times, and the sleep time is displayed as 5.5 H.

Display device 8 displays multiple display contents for one day illustrated in FIG. 5, that is, displays multiple display contents for several days in an up-down lined-up manner. In addition, display device 8 moves each life cycle of multiple days in an up-down direction by a scroll operation and displays the life cycle. In addition, display device 8 sequentially switches each life cycle of multiple days by a click operation, and displays the life cycle for one day at the same position on the screen. In any display method, display device 8 can display the life cycles of the multiple days of the user in comparison with each other.

The care manager in charge of the user or the service provider of the nursing care service can accurately distinguish and obtain the life behavior of the user by visually obtaining the display content of display device 8. Further, since the daily life cycle is displayed in a graphic form, the daily life cycle of the user can be accurately obtained.

In addition, since the display is not performed in a list form by the text or the like, and is performed in a graphic form, the visual check is easy, and it is easier to see the relationship between multiple items of the life behavior. For example, it is possible to visually and easily obtain the interruption of the sleep due to the urination, the length of a vacant time until the urination or breakfast after waking up in the morning, and the like. Further, since the life cycles of multiple days of the user are displayed in comparison, it is possible to easily obtain even a small change in the life cycle. For example, it is possible to obtain a slight deviation of the time slot of the meal or the sleep time slot by comparing the daily life cycles of day before yesterday, yesterday, and today.

In addition, regarding the meal behavior, in addition to the number of times of meal and the time slot thereof, the meal menu is recorded and displayed. Accordingly, it is possible to obtain the quality of the meal content, for example, the quality of the nutrient balance and the deviation of instant food. In addition, regarding the sleep behavior, in addition to the sleep time and the time slot thereof, the recording and the display in which the light sleep and the deep sleep are separated are performed. In addition to the length of the sleep time, it is possible to obtain the quality of the sleep.

8. Modification and Application of Embodiment

In excretion behavior recording device 1, the service of cloud server 9 may be used to perform display on distant display section 61. In addition, it is possible to improve the determination accuracy of determination section 4 by using a sensor for detecting that the user enters the bathroom provided with toilet bowl B together. That is, determination section 4 can correctly determine, as noise, vibration waveform W in the time slot in which the user does not enter the bathroom, and determination section 4 can accurately determine the number of times of urination and the number of times of defecation based on the movement from when the user enters the bathroom to when the user leaves the bathroom. Examples of the sensor used for this application include an opening/closing detection sensor of a door of the bathroom, an infrared ray type human sensor for detecting the user, and a monitoring camera.

The feature value extracted by extraction section 3 is not limited to duration time TC and maximum amplitude value AM of vibration waveform W. For example, extraction section 3 may set an area of vibration waveform W corresponding to the vibration energy as the feature value. Alternatively, extraction section 3 may obtain a frequency distribution of vibration waveform W and set a distribution pattern, a magnitude of a specific frequency component, or the like as the feature value. When the feature value is changed, naturally, the determination method and the determination value of determination section 4 are changed in accordance with the feature value.

In life behavior display system 1A, cloud server 9 can be omitted. For example, display device 8 can be configured to directly acquire the excretion data from recording section 5 and directly acquire the meal data and the sleep data from recording section 74. In addition, life behavior recording device 7 may be configured to detect and record the bathing behavior of the user by providing the detection section in the bathroom, or to detect and record the face washing and hand washing behavior of the user by providing the detection section in a washstand.

Figure 3:
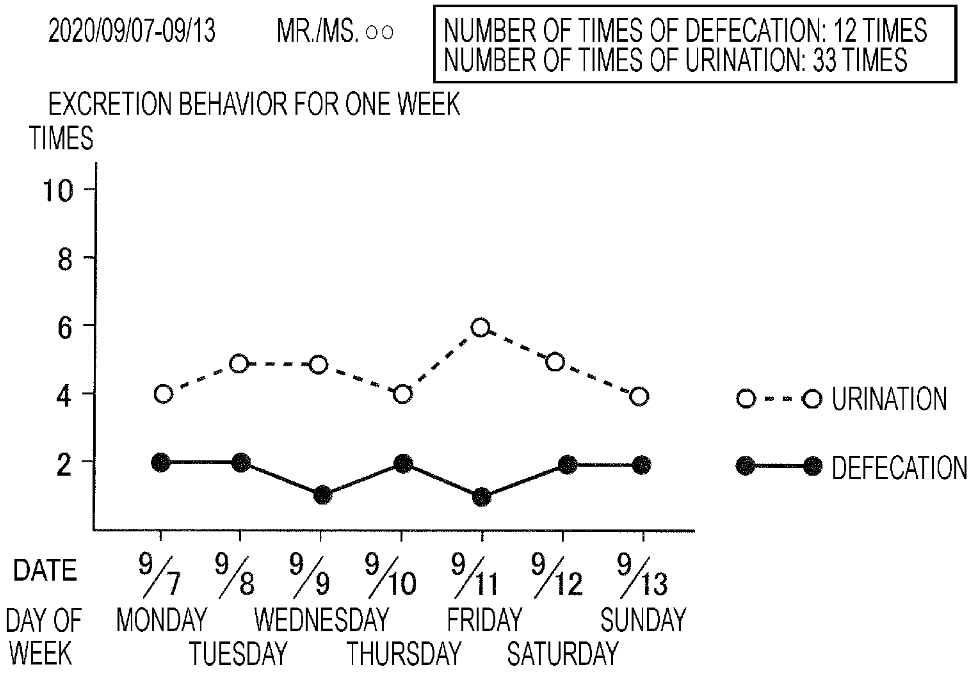
FIG. 3 is a diagram illustrating an example in which a display section displays excretion behavior in a time-series graphic form.

Further, based on a selection operation of a display menu, display device 8 may display, in addition to the screen of "life cycle" illustrated in FIG. 5, the screen of "excretion behavior for one week" illustrated in FIG. 3, the screen of "meal behavior for one week" (not illustrated), and the screen of "sleep behavior for one week" (not illustrated), in a switching manner or in a lined-up manner. Various modifications and applications in addition to the embodiment can be made.

REFERENCE SIGNS LIST

1: excretion behavior recording device, 1A: life behavior display system, 2: detection section, 3: extraction section, 3A: FPGA device, 4: determination section, 5: recording section, 51: internal memory, 6: personal computer, 61: display section, 7: life behavior recording device, 71, 72: detection section, 73: analysis section, 74: recording section, 75: memory, 8: display device, 9: cloud server, 92: cloud memory, B: toilet bowl, W: vibration waveform, TC: duration time, AM: maximum amplitude value

The invention claimed is:

1. An excretion behavior recording device comprising:

a detection section configured to detect a vibration waveform of a toilet bowl used by a user;

an extraction section in communication with the detection section and configured to extract a feature value included in the vibration waveform and indicating excretion behavior of each of urination and defecation of the user;

a determination section in communication with the extraction section and configured to determine whether an occurrence cause of the vibration waveform is the urination or the defecation based on the extracted feature value; and a recording section configured to record the determined occurrence cause of the vibration waveform being the urination or the defecation, wherein the detection section is attached at a position on an outer surface of the toilet bowl within a range of a height of cleaning water stored in the toilet bowl.

2. The excretion behavior recording device according to claim 1, wherein the feature value includes at least one of a duration time and a maximum amplitude value of the vibration waveform.

3. The excretion behavior recording device according to claim 2, wherein the feature value includes the duration time and the maximum amplitude value of the vibration waveform, and the determination section is configured to determine that the occurrence cause of the vibration waveform is the urination in a case where the duration time is longer than a first threshold time and the maximum amplitude value is smaller than a first threshold amplitude value, and determine that the occurrence cause of the vibration waveform is the defecation in a case where the duration time is shorter than a second threshold time and the maximum amplitude value is larger than a second threshold amplitude value.

4. The excretion behavior recording device according to claim 1, wherein the recording section is configured to record the determined occurrence cause of the vibration waveform being the urination or the defecation in association with occurrence dates and times of the determined urination and defecation, respectively.

5. The excretion behavior recording device according to claim 1, wherein the extraction section, the determination section, and the recording section are configured using a field-programmable-gate-array device (FPGA device), and the recording section is configured to perform recording in an internal memory of the FPGA device or perform recording in an external memory via communication.

6. The excretion behavior recording device according to claim 1, wherein the determination section is configured to determine that the occurrence cause of the vibration waveform is noise other than the urination and the defecation in a case where it is not possible to determine that the occurrence cause is at least one of the urination and the defecation based on the extracted feature value.

7. The excretion behavior recording device according to claim 1, further comprising:

a display section configured to display a content recorded by the recording section.

8. The excretion behavior recording device according to claim 1, wherein the detection section is provided on the toilet bowl of which the user who is a recording target is one.

9. A life behavior display system comprising:

a excretion behavior recording device including a detection section configured to detect a vibration waveform of a toilet bowl used by a user, wherein the detection section is attached at a position on an outer surface of the toilet bowl within a range of a height of cleaning water stored in the toilet bowl, an extraction section in communication with the detection section and configured to extract a feature value included in the vibration waveform and indicating excretion behavior of each of urination and defecation of the user, a determination section in communication with the extraction section and configured to determine whether an occurrence cause of the vibration waveform is the urination or the defecation based on the extracted feature value, and a recording section configured to record the determined occurrence cause of the vibration waveform being the urination or the defecation;

a life behavior recording device configured to detect and record life behavior other than the excretion behavior of the user in a residence; and a display device configured to display multiple items of the life behavior including the excretion behavior of the user in a time-series graphic form.

10. The life behavior display system according to claim 9, wherein the life behavior recording device includes a detection section configured to detect movement of the user in the residence, an analysis section configured to analyze the detected movement to obtain the life behavior, and a recording section configured to record the obtained life behavior in association with occurrence date and time of the obtained life behavior.

11. The life behavior display system according to claim 9, wherein the display device is configured to display the multiple items of the life behavior of the user in a graphic form of a daily life cycle.

12. The life behavior display system according to claim 9, wherein the life behavior of the user includes at least one item of meal behavior, sleep behavior, face washing and hand washing behavior, clothing change behavior, and bathing behavior.

13. An excretion behavior recording method comprising:

a detection step of detecting a vibration waveform of a toilet bowl used by a user;

an extraction step of extracting a feature value included in the vibration waveform and indicating excretion behavior of each of urination and defecation of the user;

a determination step of determining whether an occurrence cause of the vibration waveform is the urination or the defecation based on the extracted feature value; and a recording step of recording the determined occurrence cause of the vibration waveform being the urination or the defecation, wherein the detection step uses a detection section attached at a position on an outer surface of the toilet bowl within a range of a height of cleaning water stored in the toilet bowl.

* * * * *